US008548994B2

(12) United States Patent
Mahrotra et al.

(10) Patent No.: US 8,548,994 B2
(45) Date of Patent: *Oct. 1, 2013

(54) REDUCING OVERHEADS IN APPLICATION PROCESSING (75) Inventors: Gaurav Mahrotra, Bangalore (IN); Abhinay R Nagpal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,489

(22) Filed: Apr. 20, 2012

(65) Prior Publication Data

US 2012/0254886 A1 Oct. 4, 2012

Related U.S. Application Data (63) Continuation of application No. 12/638,626, filed on Dec. 15, 2009, now Pat. No. 8,285,729.

(51) Int. Cl.
*G06F 17/30* (2006.01)
(52) U.S. Cl.
USPC ............................................. 707/727
(58) Field of Classification Search
USPC ................................................. 707/727, 740
See application file for complete search history.

(56) References Cited

U.S. PATENT DOCUMENTS

| 4,566,444 | A | 1/1986 | Spolyar |
| 6,654,743 | B1 | 11/2003 | Hogg et al. |
| 7,661,030 | B2 | 2/2010 | Bozak et al. |
| 2004/0122953 | A1 | 6/2004 | Kalmuk et al. |
| 2006/0129885 | A1* | 6/2006 | Bozak et al. .................... 714/15 |
| 2008/0282252 | A1 | 11/2008 | Prasanna et al. |
| 2009/0049443 | A1 | 2/2009 | Powers et al. |
| 2009/0257397 | A1* | 10/2009 | Kwak et al. ................... 370/331 |

FOREIGN PATENT DOCUMENTS

| WO | WO2008018969 A1 | 2/2008 |
| WO | 02/091244 A1 | 10/2012 |

OTHER PUBLICATIONS

PCT International Search Report, mailed Apr. 4, 2011 based on PCT/EP2010/069001.
PCT Written Opinion of the ISA, mailed Apr. 4, 2011, based on PCT/EP2010/069001.
IBM Confidential "Memory allocation in DB2", 2009, 6pp.
Luo et al., "The Intelligent Secure Structure Based on Active Block Ciphers for Application Layer of Internet", 2008 China, CISP (Congress on Image & Signal Processing), IEEE, pp. 52-54.

(Continued)

*Primary Examiner* — Baoquoc N To
(74) *Attorney, Agent, or Firm* — Kali Law Group, PC (57) ABSTRACT

A method, a system and a computer program of reducing overheads in multiple applications processing are disclosed. The method includes identifying resources interacting with each of the applications from a set of applications and grouping the applications from the set of applications, resulting in at least one application cluster, in response to the identified resources, wherein overheads associated with re-initialization of agents assigned to the identified resources are reduced. The method further includes assigning an agent corresponding to each of the identified resources and initializing the agent corresponding to each of the identified resources. The method further includes identifying parameters associated with the identified resources, pre-processing the identified parameters for each of the identified resources, and also includes selecting a clustering means for the clustering.

20 Claims, 5 Drawing Sheets

(56) References Cited

OTHER PUBLICATIONS

Sheguo et al., "An Enterprise Intelligent System Development and Solution Framework", 2007 China, ICEMI (Conf. on Elect. Measurement & Instrutments, pp. 115-118.
German Patent Office, Office Action mailed Oct. 15, 2012; re: ; 8 pp. (not translated).
Li, Chengkai, et al., "Supporting Ranking and Clustering as Generalized Order-By and Group-By", (Jun. 2007) Beijing, China, SIGMOD '07, Jun. 14, 2007, 12 pp.
"Virtual Processors", (2005) IBM Info Center, 8 pp.
Sonar, "An Enterprise Intelligent System Development and Solution Framework", (2008) Int'l Jrnl of App. Science, Eng. & Tech 4;1, 6 pp.

* cited by examiner

REDUCING OVERHEADS IN APPLICATION PROCESSING

BACKGROUND OF THE INVENTION

Computer applications use a plurality of resources including database objects. Each database allocates an agent to an application and serves it. In current practice agents are allocated to applications, and applications are grouped at random. The agents are initialized and then after serving the application they are kept initialized for some time, in case the same application needs them, else they are allocated to some other application at random thus they need to be reinitialized with information like indexes, statement heap, query heap etc. This re-initialization can be a big overhead and can have adverse impact on throughput.

SUMMARY OF THE INVENTION

Principles of the embodiments of the invention are directed to a method, a system and a computer program of reducing overheads in multiple applications processing. Accordingly, embodiments of the invention disclose identifying resources interacting with each of the applications from a set of applications and grouping the applications from the set of applications, resulting in at least one application cluster, in response to the identified resources.

A further embodiment of the invention discloses assigning an agent corresponding to each of the identified resources, wherein the identified resource is at least one selected from a database object, a set of statements, a set of queries, database metadata and a database and initializing the agent corresponding to each of the identified resources.

Embodiment of the invention further includes identifying parameters associated with the identified resources, wherein the parameters are selected from a pre-defined set comprising a statement heap, an index heap, queries, and a query heap, and also includes clustering the applications using the identified parameters.

Embodiment of the invention further includes pre-processing the identified parameters for each of the identified resources, wherein the pre-processing is selected from a pre-defined set comprising modifying the parameters, altering the parameters, logically modifying the parameters, and combining the parameters and also includes selecting a clustering means for the clustering, wherein the clustering means is selected from a set comprising a supervised clustering means and an unsupervised clustering means, and wherein the unsupervised clustering means comprises a k-means clustering.

Embodiment of the invention further includes computing the application clusters using the selected clustering means and the identified parameters, and also includes sharing the agents corresponding to each of the identified resources interacting with the applications in the at least one application cluster. Other embodiments are also disclosed.

BRIEF DESCRIPTION OF THE DRAWINGS

Embodiments of the invention are described in detail below, by way of example only, with reference to the following schematic drawings, where.

DETAILED DESCRIPTION OF THE INVENTION

Embodiments of the invention are directed to a method, a system and a computer program of reducing overheads in multiple applications processing. Typically, in a computer architecture using multiple applications, the applications are grouped at random. Agents of individual resources are allocated to a plurality of applications and the agents are initialized. After serving the application they are kept initialized for some time, in case the same application needs them, else they are allocated to some other application at random thus they need to be reinitialized with information like indexes, statement heap, query heap etc. This re-initialization can be a big overhead and can have adverse impact on throughput.

Figure 1:
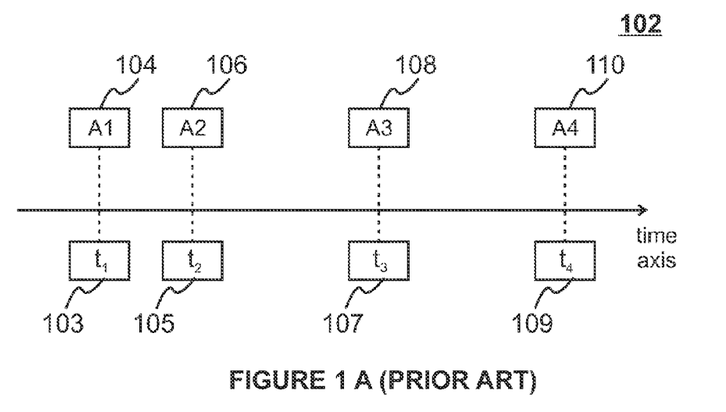
FIG. 1A, FIG. 1B, and FIG. 1C show schematics of multiple applications processing in accordance with the prior art.

FIG. 1A, FIG. 1B, and FIG. 1C show schematics of multiple applications processing in accordance with the prior art.

FIG. 1A schematic 102 depicts a time axis on which there are four exemplary timestamps. The four timestamps are depicted as $t_1$ 103, $t_2$ 105, $t_3$ 107, and $t_4$ 109. In the illustrated example, $t_1 < t_2 < t_3 < t_4$. For each timestamp there is a corresponding application that is used or executed at that particular timestamp. In an exemplary mode, application A1 104 is invoked at timestamp $t_1$ 103, application A2 106 is invoked at timestamp $t_2$ 105, application A3 108 is invoked at timestamp $t_3$ 107 and application A4 110 is invoked at timestamp $t_4$ 109.

FIG. 1B schematic 120 depicts a set of four exemplary applications A1 104, A2 106, A3 108, and A4 110. Schematic 120 also includes two exemplary query resources Q1 122 and Q2 124. Schematic 120 further includes two exemplary tables as resources T1 126 and T2 128. In an exemplary mode, application A1 104 accesses query Q2 124 and table T1 126. In an exemplary mode, application A2 106 accesses query Q1 122 and table T2 128. In an exemplary mode, application A3 108 accesses query Q2 124 and table T1 126. In an exemplary mode, application A4 110 accesses table T2 128.

Table 1 depicts the information of FIG. 1B in a tabular format. Table 1 indicates access or use of a resource by the corresponding application. The "x" in Table 1 indicates which resource is being used.

TABLE 1

|    | T1 | T2 | Q1 | Q2 |
|----|----|----|----|----|
| A1 | x  |    |    | x  |
| A2 |    | x  | x  |    |
| A3 | x  |    |    | x  |
| A4 |    | x  |    |    |

FIG. 1C schematic 140 depicts a set of four exemplary applications A1 104, A2 106, A3 108, and A4 110. In one existing practice, the applications are grouped at random. In another existing way, the applications are grouped according to FCFS (First Come, First Served) algorithm. If the FCFS algorithm is used, and two groups are created in the exemplary four applications A1 104, A2 106, A3 108, and A4 110, the groups G1 142 and G2 144 will get formed, as is further shown in Schematic 140.

Agents of database objects, which is an exemplary resource used or accessed by applications, contain information about, such as, for example, a statement heap, a index heap, SQL, and other database metadata. Even though Applications A1 104 and application A2 106 use or access two different and possibly unrelated resources, as they are clustered in one group G1 142, the agent of A1 104 needs to be re-initialized for A2 106, which could be an unnecessary overhead and it could also be considerable.

Table 2 depicts the information of FIG. 1C in a tabular format. Table 2 indicates initialization of an agent by the corresponding group of applications. It is depicted in Table 2 that for group G1 142 there would be 4 agents initializations required and for G2 144 there will be 3 agents initializations required. Thus in this configuration of G1 142 and G2 144, a total of 7 agents initializations are needed.

TABLE 2

|  | T1 | T2 | Q1 | Q2 | Total |
|---|---|---|---|---|---|
| G1 = A1 + A2 | x | x | x | x | 4 |
| G2 = A3 + A4 | x | x |  | x | 3 |

Figure 2:
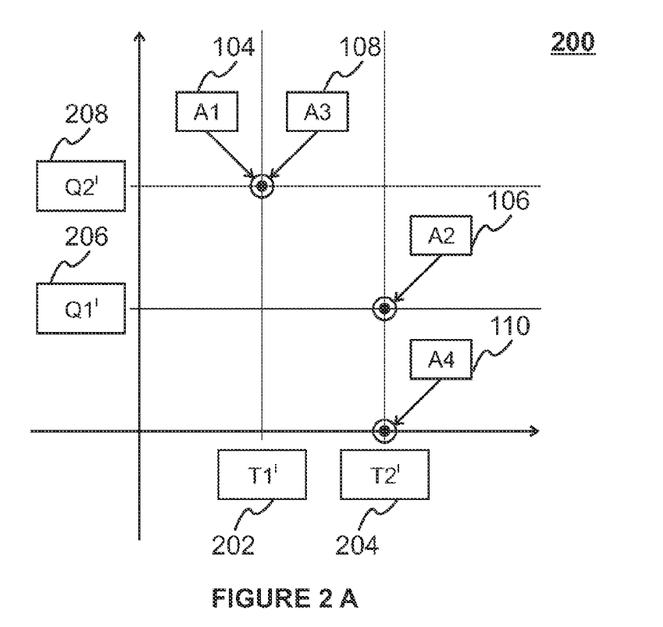
FIG. 2A and FIG. 2B show high-level schematics illustrating reducing overheads in multiple applications processing according to an example embodiment of the invention.

FIG. 2A and FIG. 2B show high-level schematics illustrating reducing overheads in multiple applications processing according to an example embodiment of the invention. FIG. 2A and FIG. 2B show describe a system for reducing overheads in multiple applications processing, the system comprising at least one processor and at least one memory, wherein the processor is adapted to identify resources interacting with each of the applications from a set of applications and group the applications from the set of applications, resulting in at least one application cluster, in response to the identified resources.

FIG. 2A depicts a schematic 200 illustrating identifying resources used by applications and quantifying the parameters to group the applications in a logical manner. Schematic 200 is a graph plot in an exemplary mode.

The graph 200 includes two elements T1' 202 and T2' 204, on the x-axis. T1' 202 is a quantified representation of Table T1 126 (FIG. 1B). Similarly T2' 204 is a quantified representation of Table T2 128 (FIG. 1B). In an exemplary mode, database tables within a schema and their indexes can be assigned weights and quantified by multiplying object id, schema id, tablespace id, and some constant. It should be obvious to one skilled in the art that various other formats can be deployed in this quantification.

The graph 200 further includes two elements Q1' 206 and Q2' 208, on the y-axis. Q1' 206 is a quantified representation of query Q1 122 (FIG. 1B). Similarly Q2' 208 is a quantified representation of query Q2 124 (FIG. 1B). In an exemplary mode, queries can be assigned weights and quantified by using the frequency tables of the queries with respect to the applications and the other related resources that invoke them. It should be obvious to one skilled in the art that various other formats can be deployed in this quantification. Based on the two axes defined based on T1' 202, T2' 204 and Q1' 206, and Q2' 208, a set of four exemplary applications A1 104, A2 106, A3 108, and A4 110, is represented in the graph 200.

FIG. 2B depicts a schematic 220 illustrating identifying resources used by applications and if the applications are grouped by a conventional manner, using the identified resources. Schematic 220 is a graph plot in an exemplary mode. The graph 220 includes all the details of graph 200. Graph 220 further includes two clusters C1 222 and C2 224. Cluster C1 222 is depicted with a dotted line boundary and includes application A1 104 and application A2 106. Cluster C2 224 is depicted with a thick line boundary and includes application A3 108 and application A4 110. Cluster C1 222 is another rendering of group G1 142 of FIG. 1C, and cluster C2 224 is another rendering of group G2 144 of FIG. 1C. Graph 220 also includes two exemplary cluster centers. Cluster center C1* 226 is the center of the cluster C1 222 and cluster center C2* 228 is the center of the cluster C2 224. Representation of group G1 142 as cluster C1 222 and representation of group G2 144 as cluster C2 224 represents the outcome of using the FCFS algorithm.

Figure 3:
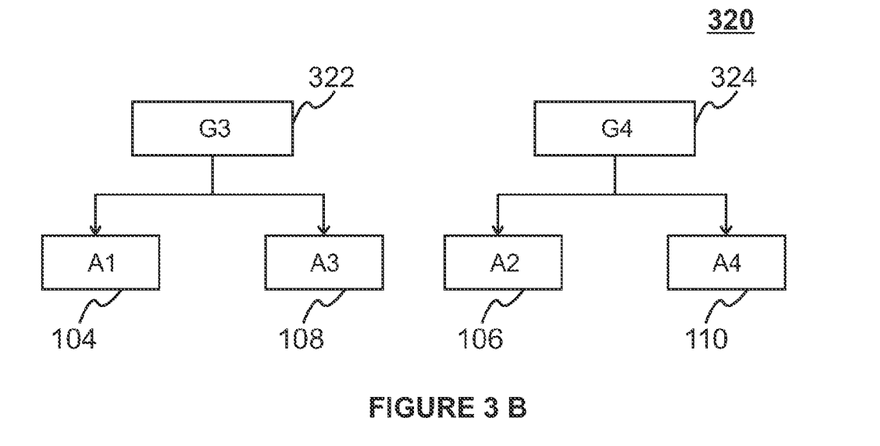
FIG. 3A and FIG. 3B show high-level schematics illustrating reducing overheads in multiple applications processing according to an example embodiment of the invention.
Figure 3A:
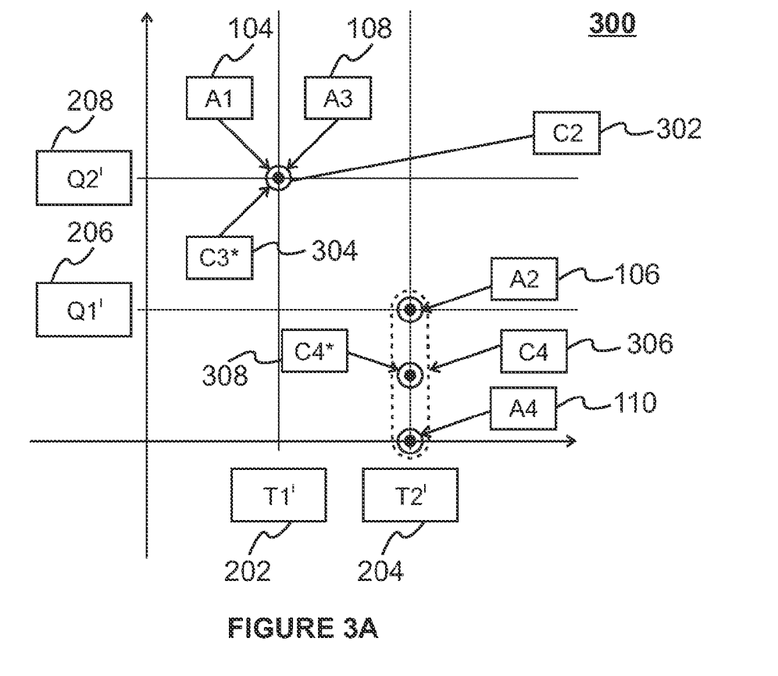

FIG. 3A depicts a schematic 300 illustrating identifying resources used by applications and if the applications are grouped by using a clustering means, using the identified resources. Schematic 300 is a graph plot in an exemplary mode. The graph 300 includes all the details of graph 200 of FIG. 2A. Graph 300 further includes two clusters C3 302 and C4 306. Cluster C3 302 is depicted with a thick line boundary and includes application A1 104 and application A3 108. Cluster C4 306 is depicted with a dotted line boundary and includes application A2 106 and application A4 110. Graph 300 also includes two exemplary cluster centers. Cluster center C3* 304 is the center of the cluster C3 302 and cluster center C4* 308 is the center of the cluster C4 306.

FIG. 3B schematic 320 depicts a set of four exemplary applications A1 104, A2 106, A3 108, and A4 110. These four applications are grouped according to an exemplary clustering algorithm according an embodiment of the invention. If the exemplary clustering is used, and two groups are created in the exemplary four applications A1 104, A2 106, A3 108, and A4 110, the groups G3 322 and G4 324 will get formed, as is further shown in Schematic 320.

Agents of database objects, which is an exemplary resource used or accessed by applications, contain information about, such as, for example, a statement heap, a index heap, SQL, and other database metadata. In the case of schematic 320, applications A1 104 and application A3 108, which use or access similar and possibly related resources, are clustered in one group G3 322, the agent of A1 104 need not be re-initialized for A3 108, which could be a significant saving on computational overhead. Applications A2 106 and application A4 110, which use or access similar and possibly related resources, are clustered in one group G4 324, the agent of A2 106 need not be fully re-initialized for A4 110, which could be a significant saving on computational overhead.

Table 3 depicts the information of FIG. 3B in a tabular format. Table 3 indicates initialization of an agent by the corresponding group of applications. It is depicted in Table 3 that for group G3 322 there would be 2 agents initializations required and for G4 324 there will be 2 agents initializations required. Thus in this configuration of G3 322 and G4 324, a total of 4 agents initializations are needed.

TABLE 3

|  | T1 | T2 | Q1 | Q2 | Total |
|---|---|---|---|---|---|
| G3 = A1 + A3 | x |  |  | x | 2 |
| G4 = A2 + A4 |  | x | x |  | 2 |

Figure 4:
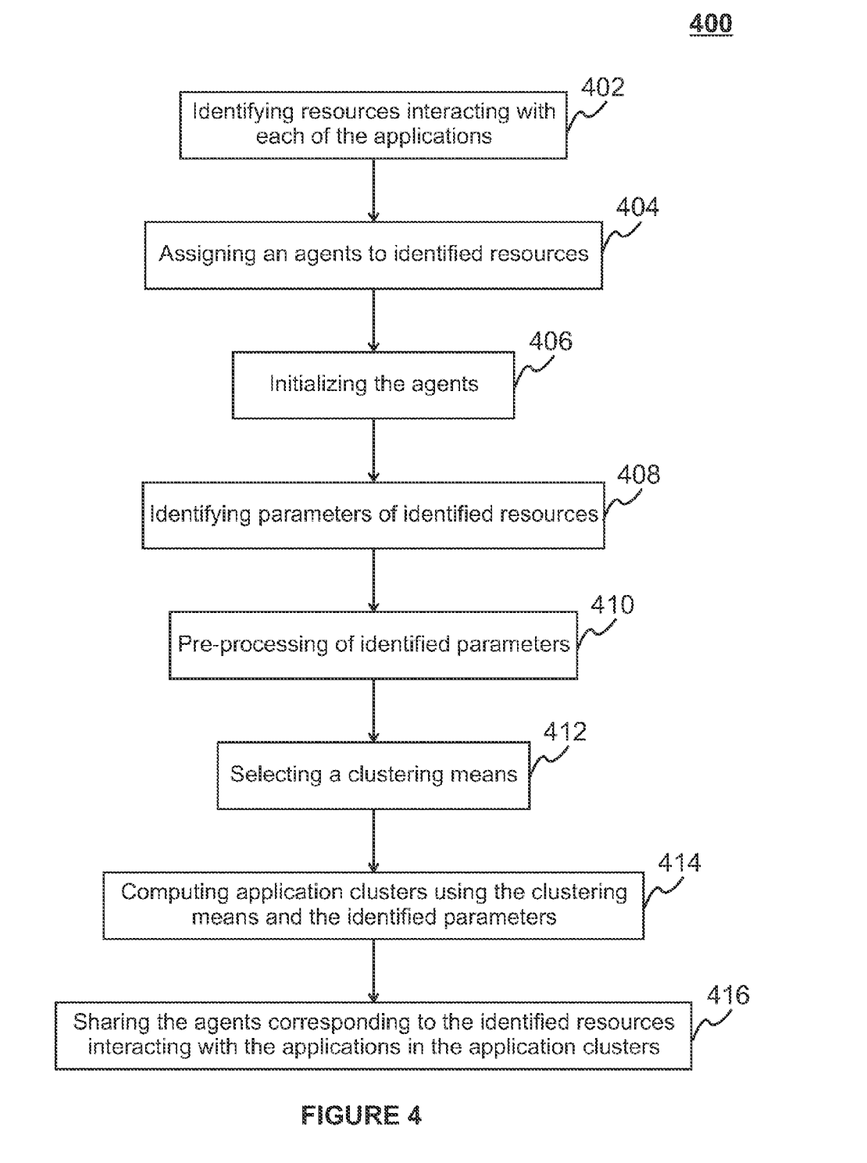
FIG. 4 shows a flow chart for reducing overheads in multiple applications processing as disclosed in one embodiment of the invention.

FIG. 4 shows a flow chart 400 for reducing overheads in multiple applications processing as disclosed in one embodiment of the invention. Flow chart 400 includes step 402 that depicts identifying resources interacting with each of the applications from a set of applications. Step 404 depicts assigning an agent corresponding to each of the identified resources, wherein the identified resource is at least one selected from a database object, a set of statements, a set of queries, database metadata and a database. Step 406 depicts initializing the agent corresponding to each of the identified resources. Step 408 shows identifying parameters associated with the identified resources, wherein the parameters are selected from a pre-defined set comprising a statement heap, an index heap, queries, and a query heap. Step 410 depicts pre-processing the identified parameters for each of the identified resources, wherein the pre-processing is selected from a pre-defined set comprising modifying the parameters, altering the parameters, logically modifying the parameters, and combining the parameters.

Step 412 shows selecting a clustering means for the clustering, wherein the clustering means is selected from a set comprising a supervised clustering means and an unsupervised clustering means, and wherein the unsupervised clustering means comprises a k-means clustering. Step 414 depicts computing the application clusters using the selected clustering means and the identified parameters. Step 416 shows sharing the agents corresponding to each of the identified resources interacting with the applications in the at least one application cluster.

Figure 5:
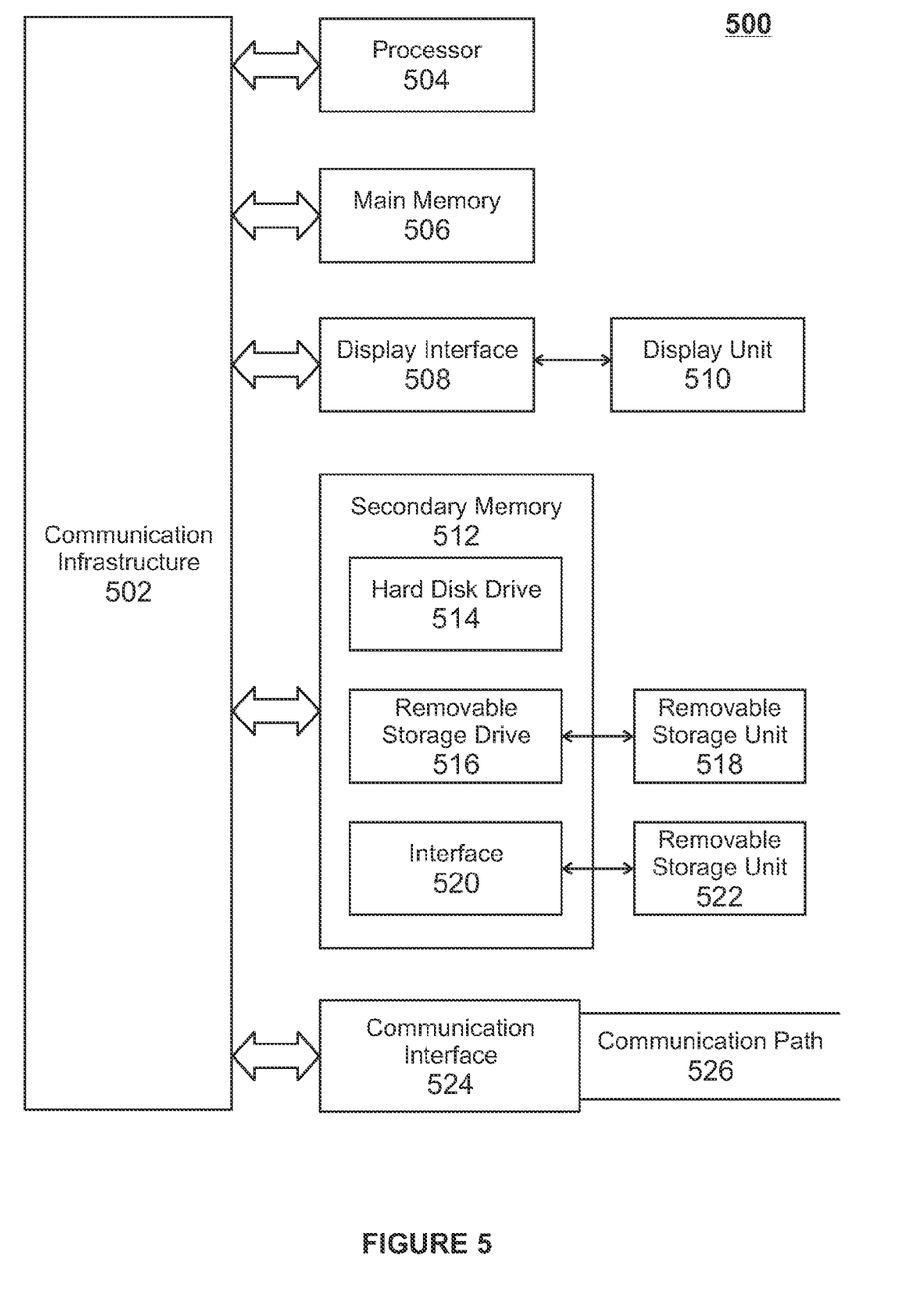
FIG. 5 shows a detailed schematic of a computer system used for reducing overheads in multiple applications processing as disclosed in FIG. 4.

FIG. 5 is a block diagram of an exemplary computer system 500 that can be used for implementing various embodiments of the present invention. In some embodiments, the computer system 500 can be used as a system executing schematics of either FIG. 3A or FIG. 3B or both. The computer system 500 can also be used to perform the steps described in FIG. 4. The Computer system 500 includes a processor 504. It should be understood although FIG. 5 illustrates a single processor, one skilled in the art would appreciate that more than one processor can be included as needed. The processor 504 is connected to a communication infrastructure 502 (for example, a communications bus, cross-over bar, or network) where the communication infrastructure 504 is configured to facilitate communication between various elements of the exemplary computer system 500. Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 configured to forward graphics, text, and other data from the communication infrastructure 502 (or from a frame buffer not shown) for display on a display unit 510. The computer system 500 also includes a main memory 506, which can be random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. The removable storage unit 518, represents, for example, a floppy disk, magnetic tape, optical disk, etc. which is read by and written to by the removable storage drive 516. As will be appreciated, the removable storage unit 518 includes a computer usable storage medium having stored therein computer software and/or data.

In exemplary embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system 500.

The computer system 500 may also include a communications interface 524. The communications interface 524 allows software and data to be transferred between the computer system and external devices. Examples of the communications interface 524 may include a modem, a network interface (such as an Ethernet card), a communications port, a PCM-CIA slot and card, etc. Software and data transferred via the communications interface 524 are in the form of signals which may be, for example, electronic, electromagnetic, optical, or other signals capable of being received by communications interface 524. These signals are provided to the communications interface 524 via a communications path (that is, channel) 526. The channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 506 and the secondary memory 512, the removable storage drive 516, a hard disk installed in the hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in the main memory 506 and/or the secondary memory 512. Computer programs may also be received via the communications interface 524. Such computer programs, when executed, can enable the computer system to perform the features of exemplary embodiments of the present invention as discussed herein. In particular, the computer programs, when executed, enable the processor 504 to perform the features of the computer system 500. Accordingly, such computer programs represent controllers of the computer system.

Embodiments of the invention further provide a storage medium tangibly embodying a program of machine-readable instructions executable by a digital processing apparatus to carry out a method of reducing overheads in multiple applications processing as described in the various embodiments set forth above and described in detail.

Advantages of various embodiments of the invention include potential reduction of overheads for initialization involved in agents being re-assigned to unrelated applications.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A method for reducing overheads in multiple applications processing, the method comprising:
   identifying resources interacting with each of the applications from a set of applications, wherein the resources each include an agent assigned to the applications; and
   grouping the applications from the set of applications based on the identified resources, resulting in at least one application cluster, in response to the identified resources, wherein application in each of the at least one application clusters share agents such that overheads associated with re-initialization of agents assigned to the identified resources are reduced.

2. The method of claim 1, wherein the identified resource is at least one selected from a database object, a set of statements, a set of queries, database metadata and a database.

3. The method of claim 1, further comprises:
   assigning the agent to each of the identified resources; and
   initializing the agent of the identified resources.

4. The method of claim 1, wherein the grouping comprises:
   identifying parameters associated with the identified resources; and
   clustering the applications using the identified parameters.

5. The method of claim 4, wherein the parameters are selected from a pre-defined set comprising a statement heap, an index heap, queries, and a query heap.

6. The method of claim 4, wherein the clustering the applications further comprises:
   pre-processing the identified parameters for each of the identified resources, wherein the pre-processing is selected from a pre-defined set comprising modifying the parametets, altering the parameters, logically modifying the parameters, and combining the parameters.

7. The method of claim 4, wherein the clustering further comprises:
   computing the application clusters using a clustering means and the identified parameters.

8. The method of claim 7, wherein the clustering means is selected front a set consisting of: a supervised clustering means and an unsupervised clustering means.

9. The method of claim 8, wherein the unsupervised clustering means comprises a k-means clustering.

10. The method of claim 7, further comprises:
sharing the agents corresponding to each of the identified resources; and
interacting with the applications in the at least one application cluster.

11. A system for reducing overheads in multiple applications processing, the system comprising at least one processor and at least one memory, wherein the processor is adapted to:
identify resources interacting with each of the applications from a set of applications wherein the resources each include an agent allocated to each of the applications; and
group the applications from the set of applications, resulting in at least one application cluster, in response to the identified resources, wherein applications in each of the at least one application clusters share agents such that overheads associated with re-initialization of agents assigned to the identified resources are reduced.

12. The system of claim 11, the processor is further adapted to:
assign the agent corresponding to each of the identified resources, wherein the identified resource is at least one selected from a database object, a set of statements, a set of queries, database metadata and a database; and
initialize the agent corresponding to each of the identified resources.

13. The system of claim 12, the processor is further adapted to:
identify parameters associated with the identified resources, wherein the parameters are selected from a pre-defined set comprising a statement heap, an index heap, queries, and a query heap; and
cluster the applications using the identified parameters.

14. The system of claim 13, the processor is further adapted to:
pre-process the identified parameters for each of the identified resources, wherein the pre-processing is selected from a pre-defined set comprising modifying the parameters, altering the parameters, logically modifying the parameters, and combining the parameters.

15. The system of claim 13, the processor is further adapted to:
select a clustering means for the clustering, wherein the clustering means is selected from a set comprising a supervised clustering means and an unsupervised clustering means, and wherein the unsupervised clustering means comprises a k-means clustering;
compute the application clusters using the selected clustering means and the identified parameters; and
share the agents corresponding to each of the identified resources interacting with the applications in the at least one application cluster.

16. A non-transitory storage medium tangibly embodying a program of machine-readable instructions executable by a digital processing apparatus to carry out a method of reducing overheads in multiple applications processing, the non-transitory storage medium is configured to:
identify resources interacting with each of the applications from a set of applications wherein the resources each include an agent allocated to each of the applications; and
group the applications from the set of applications, resulting in at least one application cluster, in response to the identified, resources, wherein applications in each of the at least one application clusters share agents such that overheads associated with re-initialization of agents assigned to the identified resources are reduced.

17. The non-transitory storage medium of claim 16, further configured to:
assign the agent corresponding to each of the identified resources, wherein the identified resource is at least one selected from a database object, a set of statements, a set of queries, database metadata and a database; and
initialize the agent corresponding to each of the identified resources.

18. The non-transitory storage medium of claim 17, further configured to:
identify parameters associated with the identified resources, wherein the parameters are selected from a pre-defined set comprising a statement heap, an index heap, queries, and a query heap; and
cluster the applications using the identified parameters.

19. The non-transitory storage medium of claim 18, further configured to:
pre-process the identified parameters for each of the identified resources, wherein the pie-processing is selected from a pre-defined set comprising modifying the parameters, altering the parameters, logically modifying the parameters, and combining the parameters, 20. The non-transitory storage medium of claim 19, further configured to:
select a clustering means for the clustering, wherein the clustering means is selected from a set consisting of, a supervised clustering means and an unsupervised clustering means, and wherein the unsupervised clustering means comprises a k-means clustering;
compute the application clusters using the selected clustering means and the identified parameters; and
share the agents corresponding to each of the identified resources interacting with the applications in the at least one application cluster.

* * * * *